3,606,925
LIMITING CONTAMINATION OF WASTE DISPOSAL WELLS
Fred H. Poettmann, Littleton, Colo., assignor to
Marathon Oil Company, Findlay, Ohio
No Drawing. Filed Nov. 3, 1969, Ser. No. 873,669
Int. Cl. B65g 5/00
U.S. Cl. 166—305D                               6 Claims

ABSTRACT OF THE DISCLOSURE

Contamination of underground aquifers by waste materials injected through disposal wells is limited by injecting a mobility buffer ahead of the waste material. The mobility buffer can be water containing a mobility reducing agent, e.g. water-soluble polymer, a water-external emulsion, or any other fluid containing a mobility reducing agent. A more favorable mobility ratio can be achieved by injecting a series of consecutively mobility graded fluids into the aquifer.

BACKGROUND OF THE INVENTION

Disposal of waste materials into fresh water aquifers often presents magnified contamination problems since waste materials, particularly aqueous waste materials, often tend to seek out and establish channels within the fresh water aquifer. These channels may "finger out" in such a fashion and at such a rate that portions of the fresh water aquifer away from the waste disposal well injection point may be contaminated long before the major portion of the waste material reaches that distant point. This fingering effect is due to the fact that waste materials are often more mobile than the waters of the aquifer, and therefore these higher mobility fluids tend to diffuse to distant parts of the aquifer faster than the water originally in the aquifer.

The prior art teaches in U.S. Pat. 3,380,522, a method of stopping the horizontal advance of saline water into fresh water aquifers by injecting into these aquifers a slurry containing granular materials such as reclaimed oil well drilling mud and sedimentary clays. The patent claims that such materials form an impermeable bridging mass in the aquifer and thereby block the intruding contaminating waters. Although this method may effectively block the outflow of contaminating materials into a fresh water aquifer, it limits the volume of the aquifer available in disposal well applications by effectively confining the aquifer to a fixed volume.

The object of this invention is to create a mobile piston-like mobility buffer within the aquifer which can expand as more waste material is injected behind it and yet still prevent the contaminating material from fingering out into the aquifer beyond the edge of the buffer to distant, otherwise uncontaminated, fresh water pumping wells.

SUMMARY OF THE INVENTION

Applicant has discovered a method of limiting contamination in waste disposal wells by injecting a slug consisting of an aqueous mobility buffer before the contaminating materials. The size of the buffer will be dependent on an estimate of the total waste to be injected over the life of the well. Generally from about 0.1 to about 25% formation pore volume (based on the anticipated pore volume necessary to receive the total, anticipated, waste material) and preferably 1–10% is useful. The mobility ratio should be favorable, i.e. the mobility should be sufficiently low to protect against fingering. The mobility buffer can have mobilities graded from a low at the front to a high at the rear, preferably the mobility at the rear is about equal to the mobility of the waste maerials flowing in the aquifer. Also, the mobilities of the buffer can be graded in a logarithmic fashion as taught in U.S. 3,467,187 to Gogarty et al.

After the mobility buffer is injected, the waste material can be injected without fear of contamination of distant parts of the aquifer. Also, pumping wells can be drilled ahead of the advancing buffer front to withdraw the original uncontaminated aquifer fluid.

The mobility buffer can be an aqueous solution containing a mobility reducing agent (e.g. water-soluble polymers), water-external emulsions, or any fluid containing a mobility reducing agent which is compatible in the aquifer. Especially useful water-soluble polymers are the polysaccharides and the high molecular weight, partially hydrolyzed polyacrylamides such as those marketed by the Dow Chemical Corporation under the trade name Dow "Pusher." Also, anionic polymers exhibiting mobility reducing agents are useful. Examples of water-external emulsions can be found in U.S. Pat. 3,266,570 to Gogarty teaching a composition of 60% by volume, water; 32.2% straight-run gasoline; 5.8% alkylaryl naphthenic monosulfonate; and 2% isopropanol—the initial portion of this emulsion slug has a viscosity of about 10.9 cps., and the trailing edge of the emulsion has a viscosity of approximately that of water. Water-thickening agents known to solution technology include; sugars, dextrans, carboxymethyl cellulose, amines, glycerin, alcohols, mixtures of these agents, and polymers in general which exhibit a mobility reducing effect on the buffer.

Waste disposal fluids containing divalent cations such as calcium and barium in large concentrations may adversely affect the viscosity characteristics of the polymer, that is, they may tend to lower its viscosity. Such polymer degradation can be avoided by insulating the mobility buffer slug from the disposal materials. Water can be used as the slug spacer insulation material. Volume amounts of the spacer slug can be about equal to the volume of mobility buffer injected. Preferably, the insulating or spacer fluid injected after the mobility buffer slug will have a mobility about equal to the mobility of the contaminating fluid injected into the aquifer, i.e. very small amounts of mobility reducing agent can be added to the spacer slug.

Preferably, the mobility buffer is injected before the waste material is injected into the well, however, it is recognized that special mobility buffer injection wells can be employed at distant points in the aquifer between the central waste disposal well and a distant fresh water pumping well. This technique would at least conserve the portion on the aquifer still uncontaminated by the advance of waste disposal fluid. It is also recognized that the mobility buffer can be "positioned" in the aquifer by various techniques known to the art such as removing fluids from at leant one other well in fluid communication with the aquifer so as to induce said mobility buffer to flow into desired positions.

What is claimed is:

1. A method of limiting the unnecessary advance of contaminating fluids in an underground aquifer wherein the fluids are injected into the aquifer through an injection means, the method comprising injecting into the aquifer in advance of the contaminating fluids a substantially aqueous mobility buffer having sufficiently low mobility to reduce the fingering of the contaminating fluids into at least portions of the aquifer.

2. The method of claim 1 wherein the mobility buffer is substantially aqueous and contains a mobility reducing agent selected from the group consisting of polysaccharides and partially hydrolyed, high molecular weight polyacrylamides.

3. A method of limiting aquifer contamination of waste materials injected into an aquifer through an injection means in fluid communication with the aquifer, the method comprising injecting into the aquifer in advance of the waste materials from about 0.1 to about 25% formation pore volume, based on the anticipated pore volume to be occupied by the total amount of waste materials to be injected, of a substantially aqueous mobility buffer having a sufficiently low mobility to reduce the tendency of the waste materials to finger into at least portions of the aquifer.

4. The method of claim 3 wherein at least the front portion of the mobility buffer has a mobility about equal to or less than about the mobility of the formation fluids flowing ahead of the buffer.

5. The method of claim 3 wherein at least the back portion of the mobility buffer has a mobility about equal to or less than about the mobility of the front portion of the waste material to prevent at least immediate degradation 6. The method of claim 3 wherein an aqueous insulating slug is injected between the mobility buffer and the waste material to pervent at least immediate degradation of the mobility of the mobility buffer.

References Cited
UNITED STATES PATENTS

| | | | |
|---|---|---|---|
| 3,152,640 | 10/1964 | Marx | 166—305X(D) |
| 3,175,614 | 3/1965 | Wyllie | 166—305X(D) |
| 3,261,399 | 7/1966 | Coppel | 166—273 |
| 3,266,570 | 8/1966 | Gogarty | 166—273 |
| 3,305,016 | 2/1967 | Lindblom et al. | 166—275X |
| 3,318,380 | 5/1967 | Tenny | 166—305(D) |
| 3,379,260 | 4/1968 | O'Brien | 166—305X(D) |
| 3,380,522 | 4/1968 | Payne, Jr., et al. | 166—268 |
| 3,400,761 | 9/1968 | Latimer, Jr., et al. | 166—274 |
| 3,467,187 | 9/1969 | Gogarty et al. | 166—273 |

STEPHEN J. NOVOSAD, Primary Examiner

UNITED STATES PATENT OFFICE
CERTIFICATE OF CORRECTION

Patent No. 3,606,925          Dated Oct. 26, 1971

Inventor(s) Fred H. Poettmann

It is certified that error appears in the above-identified patent and that said Letters Patent are hereby corrected as shown below:

| | |
|---|---|
| Col. 2, line 8: | Delete "maerials" and insert --materials--. |
| Col. 3, line 13: | Delete "hydrolyed" and insert --hydrolyzed--. |
| Col. 4, line 6: | Delete "material to prevent at least immediate degradation" and insert --materials flowing in the formation.--. |
| Col. 4, line 9: | Delete "pervent" and insert --prevent--. |

Signed and sealed this 21st day of March 1972.

(SEAL)
Attest:

EDWARD M. FLETCHER, JR.
Attesting Officer

ROBERT GOTTSCHALK
Commissioner of Patents